United States Patent Office.

GEORGE W. WAITT, OF PHILADELPHIA, PENNSYLVANIA.

Letters Patent No. 79,790, dated July 7, 1868.

IMPROVEMENT IN THE MANUFACTURE OF DESICCATED COCOA-NUT.

*The Schedule referred to in these Letters Patent and making part of the same.*

TO ALL WHOM IT MAY CONCERN:

Be it known that I, GEORGE W. WAITT, of the city of Philadelphia, in the State of Pennsylvania, have invented a new and useful Improvement in the Process for Treating the Rasped or Grated Kernel of the Cocoa-Nut, for the purpose of preserving the same for future use; and I do hereby declare that the following is a full, clear, and exact description of the same.

My invention is an improvement on the process of Maltby and Smith, patented June 25, 1867.

I do not claim the confection, as composed of the meat of the cocoa-nut, and sugar, in any given quantities, but the improved process of treating the rasped or otherwise fined meat of the nut hereinafter described, by which the rancidity apparent in Maltby and Smith's preparation after long exposure in hot climates, is entirely prevented. The method by which I accomplish this will be fully set forth in the specifications.

The nature of my invention consists in first depriving the rasped or grated kernel of the cocoa-nut of its moisture, and then coating the heated granules with pulverized white sugar.

To enable others to understand and practise my said invention, I will proceed to describe it.

I take the freshly-cleaned and finely-rasped or grated kernels of the cocoa-nuts, and spread the same evenly, about an inch deep, over the surface of a marble slab, or other suitable slab, exposed to the open air, and kept moderately heated by steam or hot water passing through a suitable series of pipes arranged directly beneath the same, frequently stirring or raking the mass until all the aqueous moisture of the same has been evaporated or expelled, and carried off into the free atmosphere—a result which will be effected in the course of two hours, more or less, and can be easily known by observation, and by its feeling dry and granular to the hand.

I now add, and intimately mix with the mass of the hot granules, about twenty-five per cent. (more or less) of pulverized white sugar, which, in consequence of the softened condition of the retained stearine of the said granulated kernels of the cocoa-nut, adheres firmly to and entirely coats each granule of the mass.

I then transfer the whole to suitable cooling-platforms or tables, and, when cool, pack in paper boxes of various sizes for the market, and the convenience of consumers.

I am aware that the cleaned kernels of the cocoa-nut have been rasped or grated, and, whilst fresh and wet, mixed with white sugar, and the two together then dried in heated, close ovens, or in heated, close chambers, and then put up in metallic cases, or boxes lined with foil, for the market; and that the milk of the nut has been boiled down, and then mixed with starch, sugar, and the rasped or grated kernels of the nuts, and, finally, put up in a similar manner for the market; but it is found that neither of the said manufactured articles will keep sweet and wholesome for any considerable length of time, becoming rancid and unfit for use as food in a short time, and therefore the dealers and purchasers have in many instances been subjected to great loss.

The cause of this spoiling of the said articles, I have ascertained, arises mainly from the fact that the sugar, being mixed with the freshly-rasped or grated kernels of the cocoa-nut, before any attempt is made to expel the aqueous moisture, and the difficulty, perhaps impossibility, of expelling it afterward without injuring the article by the excessive heat of the ovens or close chambers, and from the tendency of the sugar to retain the moisture as water of crystallization, which is ultimately given out in the package, causing fermentation.

When the cocoa-nut kernels are treated by my process, as described, the whole of the aqueous moisture is driven off without injuring the substance of the grated kernels, or expelling, or decomposing the stearine of the same, in which the desired flavor of the kernel is contained, and which serves as the medium whereby the dry sugar-coating is attached, and the article preserved pure and wholesome for any length of time, and in any climate, in the dry, granular condition required.

Having thus fully described my invention, what I claim as new, and desire to secure by Letters Patent, is—

The improvements in the mode of desiccating and preparing the meat of the cocoa-nut, substantially as described, and for the purposes set forth.

GEO. W. WAITT.

Witnesses:
BENJ. MORISON,
WM. H. MORISON.